Dec. 18, 1923.
E. C. BOTT
1,477,936
LID FOR CANS
Filed Oct. 2, 1922
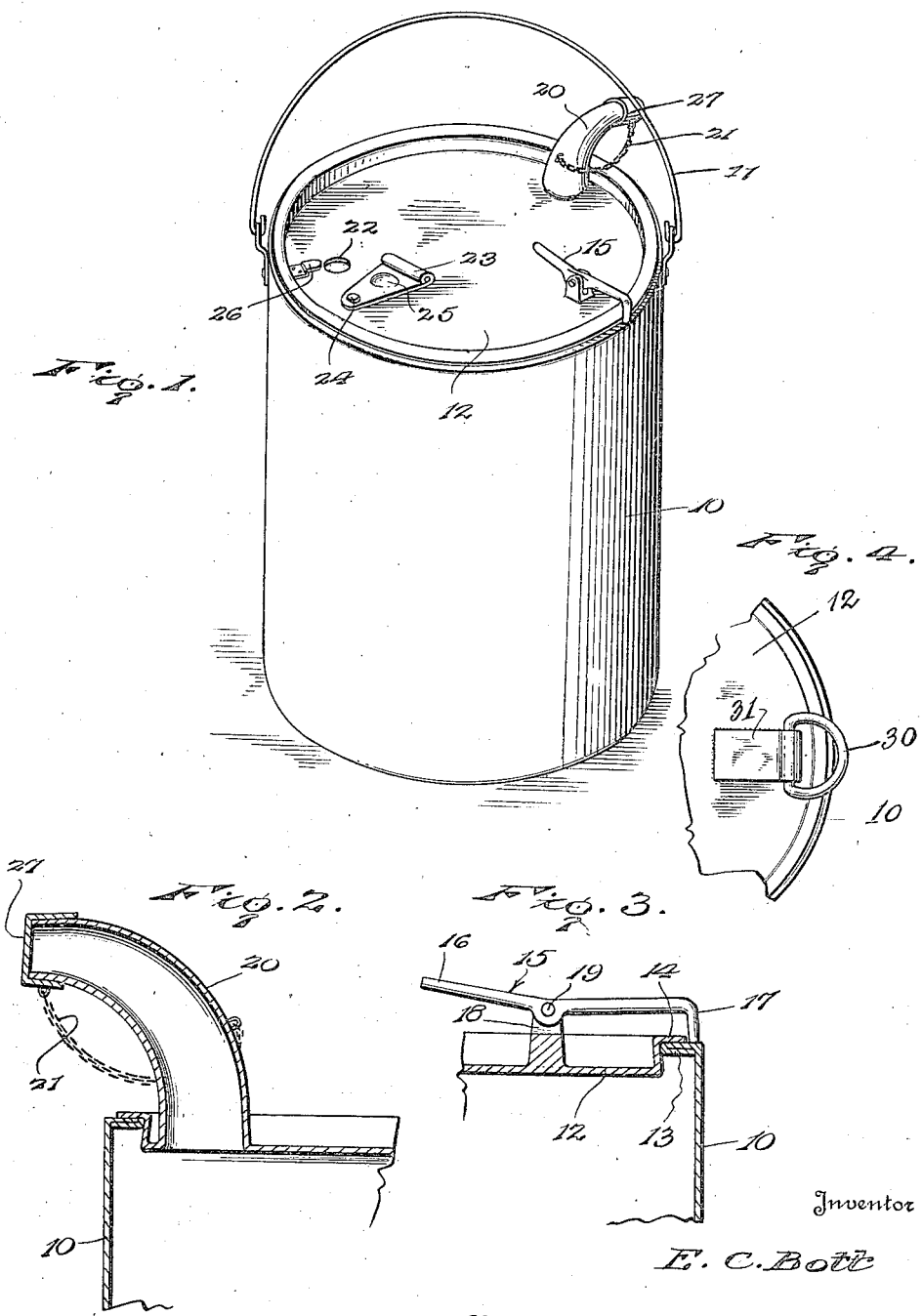
Inventor
E. C. Bott
By Lacy & Lacy, Attorneys Patented Dec. 18, 1923.

1,477,936

UNITED STATES PATENT OFFICE.

EDWARD C. BOTT, OF BIENVILLE, LOUISIANA.

LID FOR CANS.

Application filed October 2, 1922. Serial No. 591,867.

*To all whom it may concern:*

Be it known that I, EDWARD C. BOTT, citizen of the United States, residing at Bienville, in the parish of Bienville and State of Louisiana, have invented certain new and useful Improvements in Lids for Cans, of which the following is a specification.

My invention relates to a lid to be used on cans containing liquids of any kind but more particularly on cans for slow flowing substances having the consistency of syrup.

The object of the invention is to provide a lid for cans of this description, which may easily be applied and easily removed from the can and provides an air tight and dust proof closure.

Another object of the invention is to furnish the lid with a spout and a vent opening in order to facilitate the dispensing of the contents in the can.

In the accompanying drawing one embodiment of the invention is illustrated, and

Fig. 1 shows a perspective view of a can with the lid in position;

Fig. 2 is a fragmentary vertical section through the spout of the lid,

Fig. 3 is a similar section through the lifting device for the lid, and

Fig. 4 is a plan view of a modified form of lifting device.

Reference numeral 10 represents a can preferably provided with a handle 11. In the present instance, the can is being shown cylindrical and a lid 12 is made to fit tightly within a rim 13 provided around the opening in the top of the can. The lid has an annular flange 14 which is slightly narrower than the rim 13 of the can so that a space is left around the lid when positioned on the can.

Reference numeral 15 represents a lifting lever having a hand grip 16 and a hooked outer end 17, which projects beyond the edge of the lid in order to be able to engage with the top of the can, as best seen in Fig. 3. The lever 15 is hinged on a journal 19 in a suitable bearing 18. In order to remove the lid from the can, all that is necessary is to raise the hand grip 16 and thereby press down the hook end 17 against the rim 13 of the can, when the side of the lid, where the lever is placed, will be lifted from the can and the entire lid then be removed therefrom.

Reference numeral 20 represents a spout placed near the edge of the lid and opening into the can. This spout is preferably bent upwardly and outwardly from the lid and extends beyond the side of the can to facilitate the emptying of the can when tilted. The nozzle of the spout is closed by a removable cap 27, which fits tightly on the nozzle and is preferably attached thereto by means of a chain 21, so as not to get lost.

Diametrically opposite the spout 20 an aperture 22 is furnished in the lid, which forms a vent for admitting air into the can, when the latter is being emptied. Near this vent is a door 23 turned on a rivet 24 secured in the lid. The door 23 has a dent 25 in the middle, which is adapted to engage the vent 22, when the door is swung over the same and to tightly close the aperture. In order to more firmly secure the door over the vent I provide a tongue 26, under which the door 23 is intended to engage and held from swinging open.

In using this lid on a can, the contents are sure to be kept in good and sanitary condition as neither the vent 22 nor the spout 20 would permit dust and moisture from the atmosphere to enter the can and contaminate its contents. When the liquid is going to be drained off, the door 23 is first swung away from the vent 22 and the cap 27 removed, whereupon, by lifting the can by its handle 11 and tilting it with the spout lowermost, the contents will flow out through the latter. If the can is not intended to be emptied entirely, the cap 27 and the door 23 are again made to close their respective apertures and in this manner protect the contents of the can.

As soon as the can has been emptied, the lid is removed by the use of the lever 15 and it may now be placed on another can of the same size.

This lid is particularly useful for such liquids as syrup, oil, paint, varnish and similar substances that must be closed to the atmosphere when not in use.

Instead of the lid removing appliance shown in Fig. 3, I may use the still simpler construction illustrated in Fig. 4. In this construction a ring 30, is secured to the top of the lid 12, and near the edge thereof, by means of a strap 31. In this case the lid may be removed by a pull on the ring 30, while the can 10, is held firmly by the operator.

Having thus described the invention, what is claimed as new is:

1. The combination with a can having an opening; of a lid fitting tightly in said opening, an annular flange on said lid partly covering the top of the can, a spout on said lid communicating with the interior of the can and a door journaled on the lid and adapted to cover a vent opening provided on the lid, said door having a dent fitting said vent opening.

2. The combination with a cam having an opening; of a lid fitting tightly in said opening, an annular flange on said lid partly covering the top of the can, a spout on said lid communicating with the interior of the can and a door journaled on the lid and adapted to cover a vent opening provided on the lid, said door having a dent fitting said vent opening, and a tongue adjacent said door adapted to engage therewith to retain it in closed position.

3. The combination with a can having an opening; of a lid fitting tightly in said opening, an annular flange on said lid partly covering the top of the can, a spout on said lid communicating with the interior of the can, a cap adapted to close said spout and means for securing the cap on the spout, a door journaled on the lid and adapted to cover a vent opening provided on the lid, said door having a dent fitting said vent opening, and a tongue adjacent said door adapted to engage therewith to retain it in closed position.

4. The combination with a can having an opening; of a lid fitting tightly in said opening, an annular flange on said lid partly covering the top of the can, a spout on said lid communicating with the interior of the can, a cap adapted to close said spout and means for securing the cap on the spout, a door journaled on the lid and adapted to cover a vent opening provided on the lid, said door having a dent fitting said vent opening, a tongue adjacent said door adapted to engage therewith to retain it in closed position, a lever journaled on the lid and having a hook-shaped nose adapted to engage with the projecting top of the can beyond the edge of said flange and an arm on said lever for operating the same to raise the lid from the can.

5. The combination with a can having an opening; of a lid fitting tightly in said opening, an annular flange on said lid partly covering the top of the can, a spout on said lid communicating with the interior of the can, a cap adapted to close said spout and means for securing the cap on the spout, a door journaled on the lid and adapted to cover a vent opening provided on the lid, said door having a dent fitting said vent opening, and a tongue adjacent said door adapted to engage therewith to retain it in closed position and means for removing said lid from the can.

In testimony whereof I affix my signature.

EDWARD C. BOTT. [L.S.]